US011458991B2

(12) United States Patent
Lapin et al.

(10) Patent No.: US 11,458,991 B2
(45) Date of Patent: Oct. 4, 2022

(54) SYSTEMS AND METHODS FOR OPTIMIZING TRAJECTORY PLANNER BASED ON HUMAN DRIVING BEHAVIORS

(71) Applicant: Woven Planet North America, Inc., Los Altos, CA (US)

(72) Inventors: Alexandr Lapin, Sunnyvale, CA (US); Yan Chang, Mountain View, CA (US); Matthew Swaner Vitelli, San Francisco, CA (US)

(73) Assignee: Woven Planet North America, Inc, Los Altos, CA (US)

( * ) Notice: Subject to any disclaimer, the term of this patent is extended or adjusted under 35 U.S.C. 154(b) by 94 days.

(21) Appl. No.: 16/915,901

(22) Filed: Jun. 29, 2020

(65) Prior Publication Data
US 2021/0403034 A1 Dec. 30, 2021

(51) Int. Cl.
*B60W 60/00* (2020.01)
*B60W 50/06* (2006.01)

(52) U.S. Cl.
CPC ........ *B60W 60/0011* (2020.02); *B60W 50/06* (2013.01)

(58) Field of Classification Search
CPC .. B60W 60/0011; B60W 50/60; B60W 60/00; G06G 7/70; G06G 7/48; G06N 99/005; G01C 21/3492
USPC .......................................................... 701/27
See application file for complete search history.

(56) References Cited

U.S. PATENT DOCUMENTS

| 10,553,121 | B1* | 2/2020 | de Oliveira ........... G06F 16/909 |
| 10,843,690 | B2* | 11/2020 | Shalev-Shwartz .......................... B60W 60/00272 |
| 11,110,918 | B2* | 9/2021 | Hudecek ........... B60W 30/0956 |
| 11,231,717 | B2* | 1/2022 | Fan ....................... G05D 1/0088 |
| 2012/0109610 | A1* | 5/2012 | Anderson ............. B60W 30/09 703/7 |
| 2019/0186936 | A1* | 6/2019 | Ebner ................. G01C 21/3822 |

(Continued)

FOREIGN PATENT DOCUMENTS

| JP | 2018192954 A | 12/2018 |
| WO | 2020000192 A1 | 1/2020 |

OTHER PUBLICATIONS

International Searching Authority, International Search Report and Written Opinion, PCT/US2021/028777, dated Jul. 30, 2021.

*Primary Examiner* — Yazan A Soofi
(74) *Attorney, Agent, or Firm* — Christopher G. Darrow; Darrow Mustafa PC

(57) ABSTRACT

In one embodiment, a computing system of a vehicle may receive vehicle driving data associated with a vehicle driving in an environment and detected environment data associated with the environment. The system may generate a reference trajectory of the vehicle driving in the environment based on the vehicle driving data. The system may determine driving constraints associated with the environment based on the detected environmental data. The system may generate a trajectory of the vehicle based on the driving constraints. The system may determine a difference in at least one parameter associated with the trajectory relative to at least one corresponding parameter associated with the reference trajectory. The system may adjust weight values associated with cost functions of the trajectory based on the difference between the at least one parameter associated with the trajectory and the corresponding parameter associated with the reference trajectory.

20 Claims, 11 Drawing Sheets

(56) References Cited

U.S. PATENT DOCUMENTS

2020/0139959 A1* 5/2020 Akella ................ G05D 1/0088
2020/0398833 A1* 12/2020 Hudecek ........... B60W 30/0953

* cited by examiner

SYSTEMS AND METHODS FOR OPTIMIZING TRAJECTORY PLANNER BASED ON HUMAN DRIVING BEHAVIORS

BACKGROUND

Autonomous vehicles (AVs) or manually-driven vehicles with driver-assist features may navigate through their surrounding environment based on the perception data of the associated environment. A vehicle typically perceives its environment using sensors such as cameras, radars, and LiDARs. A computing system (e.g., an on-board computer and/or a remote server computer) may then process and analyze the sensor data to make operational decisions in response to situations detected in the surrounding environment. For a particular scenario encountered by an AV in the driving environment, the AV may generate a planned trajectory to navigate the vehicle in accordance with that particular scenario. The planned trajectory may be generated based on a number of parameters that are determined by human engineers.

However, the process for determining and adjusting parameters by human engineers could be inefficient and time-consuming. Furthermore, the parameters determined by human engineers could be subjective and inconsistent and may cause the AV to generate unnatural trajectories and negatively affect the riding experience of passengers.

DESCRIPTION OF EXAMPLE EMBODIMENTS

Figure 1:
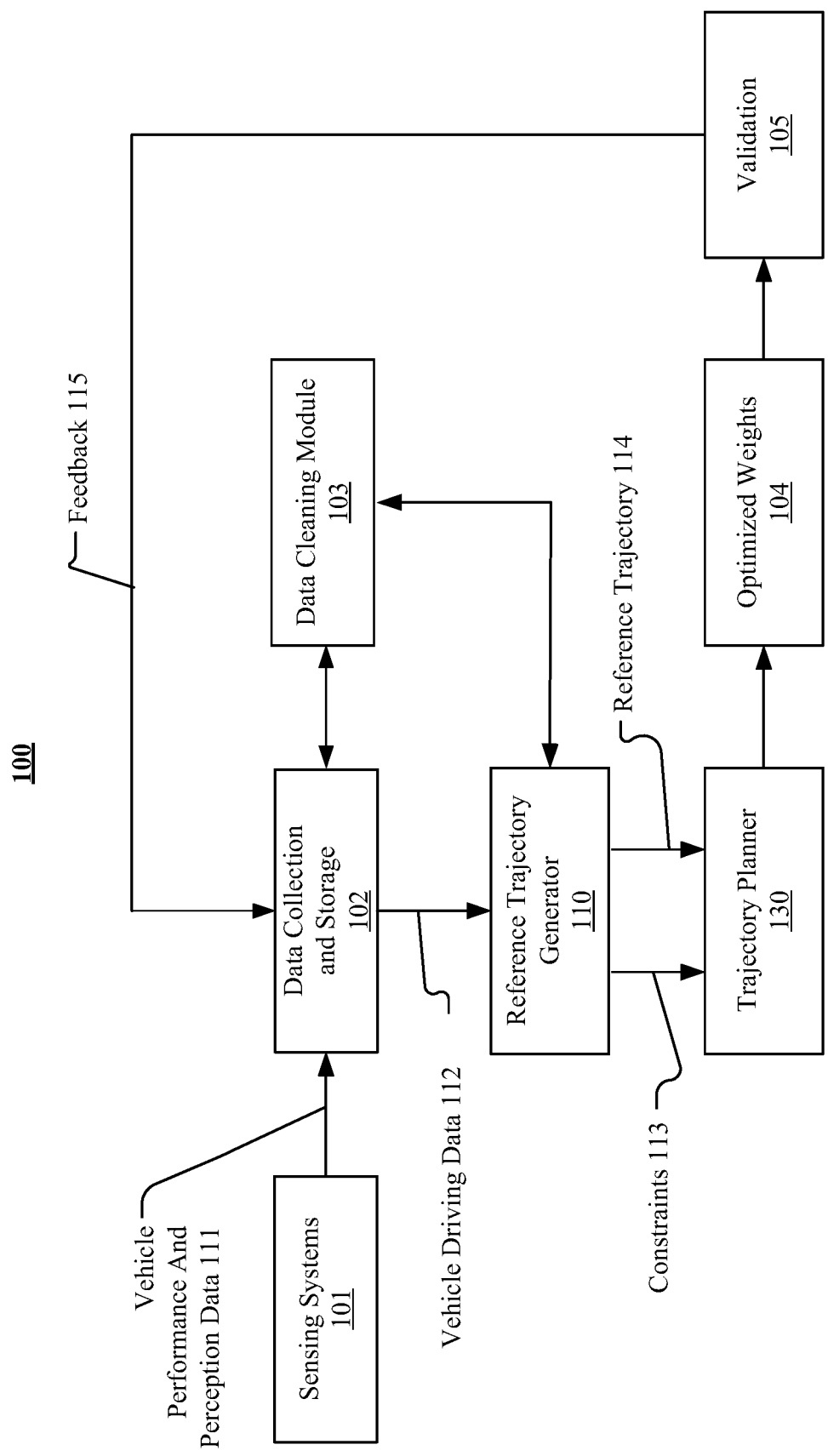
FIG. 1 illustrates an example framework for automatically tuning trajectory-evaluation function weights of an AV trajectory planner based on human driving behaviors.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

To generate vehicle trajectories for navigating AV in the autonomous driving mode, the AV may use a trajectory planner to generate a number of candidate trajectories and use a trajectory-evaluation function (e.g., a cost function) to evaluate these candidate trajectories to pick the best one. For example, the AV may use a cost function to determine a total cost for each evaluated trajectory and select the best trajectory based on the total cost values. The cost function may have a number of cost terms and a number of weights associated with these cost terms. Existing AVs may rely on human engineers to determine and adjust these weight values for the cost terms of the cost function. However, there could be a large number of cost terms for the cost function and it could be very time consuming and inefficient to determine and adjust the weight values by human engineers. Furthermore, the process of determining and adjusting weight values by human engineers could be inconsistence and subjective and may result in cost function weights that are not ideal to objectively and consistently evaluate trajectories. For example, human engineers may need to evaluate and balance many different cost terms of the candidate trajectories across various different scenarios that could potentially be faced by the vehicle because the range of desirable values and the relative importance of such cost terms may vary from scenario-to-scenario. In addition, existing approaches for evaluating and selecting trajectories based on human-determined weight values may identify the optimal trajectory in a mathematical sense, while giving little or no consideration to how this optimal trajectory will be perceived from the perspective of a human riding in the vehicle. Because of this, existing approaches for evaluating and selecting trajectories may lead to unnatural driving behavior that differs from how a human-driven vehicle would typically behave, which may degrade the experience of a human passenger riding in the vehicle.

To solve these problems, particular embodiments of the system may automatically optimize the cost term weights of the cost function of the trajectory planner based on human driving behaviors. The system may collect vehicle driving data (e.g., human driving data) including vehicle environment perception data, vehicle performance data, and localization data using vehicle-equipped sensors. Then, the system may use a reference trajectory generator to generate a reference trajectory (e.g., a human driving trajectory) and a number of constraints (e.g., observed constraints and predicted constraints) of the driving environment based on the collected vehicle driving data (e.g., human driving data). The system may use the constraints and the reference trajectory to optimize the cost term weights of the cost function used by a trajectory planner. The system may use the trajectory planner to generate a number of candidate trajectories based on the constraints of the driving environment. The system may use the cost function with the current weights to evaluate these candidate trajectories and select the best trajectory for output. Then, the system may compare the output trajectory of the trajectory planner to the reference trajectory (e.g., a human driving trajectory) and automatically tune the cost function weights of the trajectory planner based on the comparison result offline. The trajectory planner with adjusted weights may be tested on a validation platform to identify the scenarios that are currently not well handled by the trajectory planner. Then, the system may send feedback information to the data collect module to collect more vehicle driving data (e.g., human driving data) for these scenarios that are not well handled by the trajectory planner. After that, the system may use the newly collected vehicle driving data (e.g., human driving data) to further optimize the cost function weights of the trajectory planner to allow the trajectory planner to better handle these scenarios.

By automatically optimizing the cost term weights of the cost function of the trajectory planner based on human driving behaviors, the system may dramatically reduce the effort and time that are needed for determining these weight values. By using observed constraints and predicted constraints generated by the reference trajectory generator, the system may allow the trajectory planner to generate trajectories under the same constraints with what have been encountered by the human driver and allow an apple-to-apple comparison between the output trajectory of the trajectory planner and what a human driver would do under the same circumstance. By testing and validating the trajectory planner with the optimized weights, the system may identify the scenarios that are not well handled by the trajectory planner and may send feedback information to the data collection module to collect more data for these scenarios and allow the trajectory planner to be trained to better handle these scenarios. By automatically tuning the cost function weights of the trajectory planner based on human driving behaviors, the output of the trajectory planner may be more similar to the human driving behaviors.

FIG. 1 illustrates an example framework 100 for automatically tuning trajectory-evaluation function weights of an AV trajectory planner based on human driving behaviors. In particular embodiments, the framework 100 may include a data collection and storage module 102 for collecting and storing vehicle performance data and environment perception data 111 using the sensing systems 101 associated with vehicles. The data collected and stored by the data collection and storage module 102 may include vehicle driving data 112 (e.g., including vehicle performance data and environment perception data) for generating reference trajectories (and corresponding constraints) to optimize the cost function of the trajectory planner. In particular embodiments, the vehicle driving data 112 may include any suitable vehicle driving data that can be used for generating reference trajectories to optimize the cost function of the trajectory planner. In particular embodiments, the vehicle driving data may be collected from vehicles that are not operating autonomously according to outputs of vehicle trajectory planners. For example, the vehicle driving data 112 may be collected from vehicles driven by a safety driver after being disengaged from the autonomous driving mode. As another example, the vehicle driving data 112 may be collected from vehicles driven by a human driver during a demonstration driving process for generating training data or demonstration driving data. As another example, the vehicle driving data 112 may be collected from vehicles driven by a human driver with assistance of one or more computer algorithms. As another example, the vehicle driving data 112 may be collected from a human-driven vehicle having sensors. In particular embodiments, the vehicle driving data may be generated based on actual vehicle driving data, simulated vehicle driving data, or computed data by one or more computer algorithms for generating vehicle driving data. The vehicle driving data stored in the data collection and storage module 102 may be cleaned and preprocessed by a data cleaning module 103 (e.g., by human engineers or machine-learning (ML) models) to make sure that the vehicle driving data covers a wide range of scenarios that are representative (e.g., with an overall statistic distribution) to all possible scenarios that could be encountered by AVs. The framework 100 may include a reference trajectory generator 110 (also referred to as a demonstration trajectory generator) to generate a reference trajectory 114 (e.g., a human driving trajectory) and driving constraints (e.g., obstacles, road lanes, rules, other vehicles, pedestrians, etc.) of the vehicle driving environment based on the vehicle driving data 112.

In particular embodiments, the reference trajectory 114 and the driving constraints 113 may be fed to the trajectory planner 130 during an automatic optimization process for optimizing the weights of the cost function of the trajectory planner 130. During the automatic optimization process, one or more weights associated with one or more cost terms of the cost function may be adjusted based on the reference trajectory 114 (e.g., a human driving trajectory) to adjust the values of the optimized weights 104. After the weights have been optimized based on the reference trajectory 114, the trajectory planner 130 with the optimized weights 104 may be evaluated and tested using a validation platform (e.g., a simulated validation platform or a vehicle test-running platform) to identify the scenarios that are not yet well handled by the trajectory planner 130 with the current weight values. Then, the system may send feedback information 115 to the data collection and storage module 102 to retrieve from a database more vehicle driving data related to these scenarios if the database includes more vehicle driving data related to these identified scenarios, or to collect more vehicle driving data related to these identified scenarios. After that, the system may use the newly retrieved or collected vehicle driving data related to these scenarios together with the existing vehicle driving data to further optimize the cost function weights of the trajectory planner 130. The optimization process may be repeated until the output trajectory of the trajectory planner 130 matches the reference trajectories (e.g., human driving trajectories) determined based on vehicle driving data. In particular embodiments, the optimization process may be performed in a remote sever computer connected with wireless or wired network, a local computer (e.g., at a data center), or an onboard computer on the vehicle.

Figure 2:
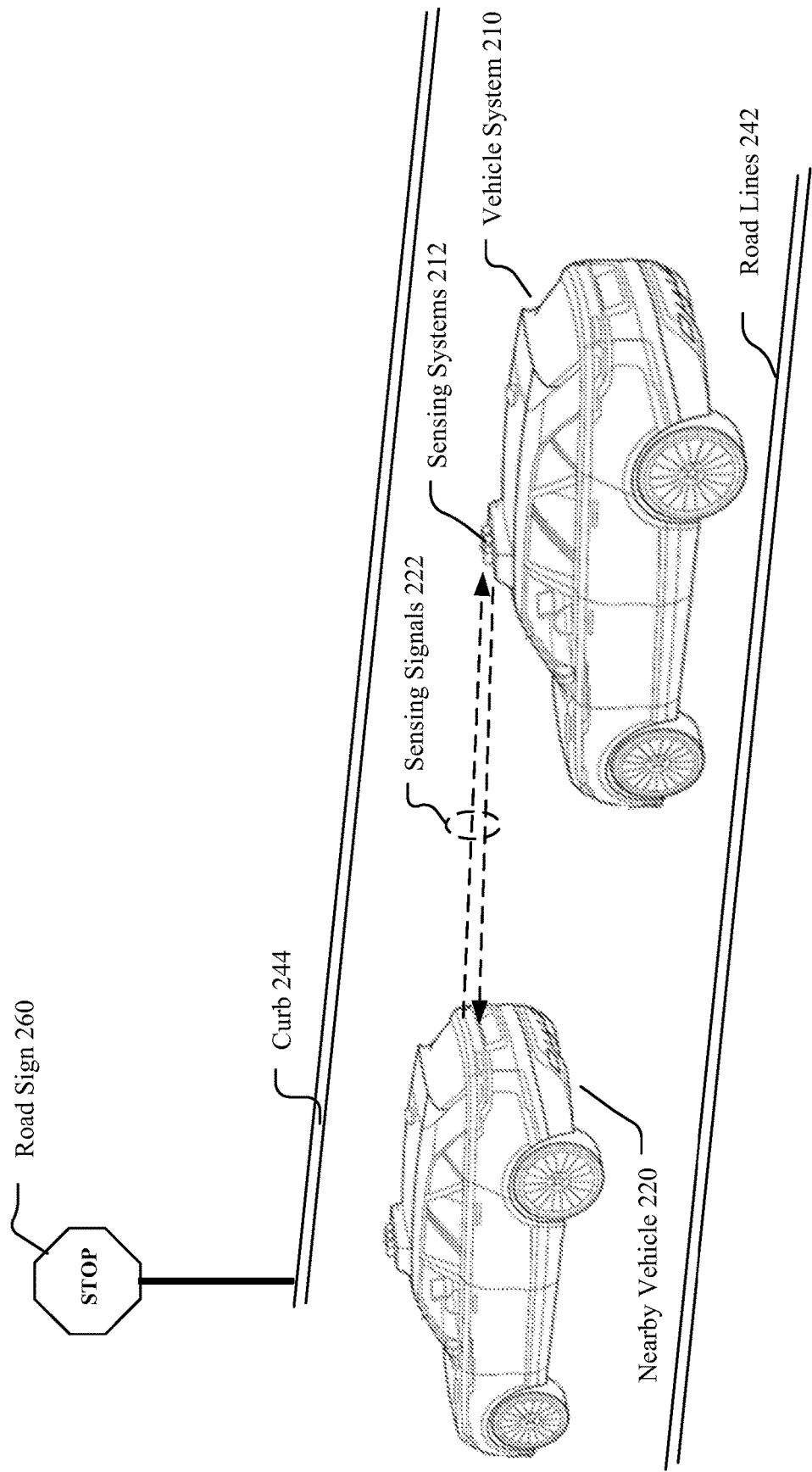
FIG. 2 illustrates an example scenario encountered by an autonomous vehicle (AV).

FIG. 2 illustrates an example scenario 200 encountered by an autonomous vehicle (AV). In particular embodiments, the vehicle system 210 (e.g., autonomous vehicles, manually-driven vehicles, computer-assisted-driven vehicles, human-machine hybrid-driven vehicles, etc.) may have sensing systems 212 for monitoring the vehicle performance and the surrounding environment. The sensing systems 212 may include, for example, but are not limited to, cameras (e.g., optical camera, thermal cameras), LiDARs, radars, speed sensors, steering angle sensors, braking pressure sensors, a GPS, inertial measurement units (IMUs), acceleration sensors, etc. The vehicle system 210 may include one or more computing systems (e.g., a data collection device, an on-board computer, a high-performance computer, a mobile phone, a tablet, a mobile computer, an embedded computing system) to collect the environment perception data and vehicle performance data. In particular embodiments, the vehicle system 210 may use the sensing system 212 to collect environment perception data. For example, the vehicle system 210 may collect data related to other vehicles or agents in the surrounding environment including, for example, but not limited to, environment images, vehicle speeds, vehicle acceleration, vehicle moving paths, vehicle driving trajectories, locations, vehicle signal status (e.g., on-off state of turning signals), braking signal status, a distance to another vehicle, a relative speed to another vehicle, a distance to a pedestrian, a relative speed to a pedestrian, a distance to a traffic signal, a distance to an intersection, a distance to a road sign, a distance to curb, a relative position to a road line, positions of other traffic agents, a road layout, pedestrians, traffic status (e.g., number of nearby vehicles, number of pedestrians, traffic signals), time of day (e.g., morning rush hours, evening rush hours, non-busy hours), type of traffic (e.g., high speed moving traffic, accident events, slow moving traffic), locations (e.g., GPS coordination), road conditions (e.g., constructing zones, school zones, wet surfaces, ice surfaces), intersections, road signs (e.g., stop sign 160, road lines 142, cross walk), nearby objects (e.g., curb, light poles, billboard), buildings, weather conditions (e.g., raining, fog, sunny, hot weather, cold weather), etc.

In particular embodiments, the collected perception data may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, a traffic status (e.g., high traffic, low traffic), driving trajectories of other vehicles, motions of other traffic agents, speeds of other traffic agents, moving directions of other traffic agents, signal status of other vehicles, etc. In particular embodiments, the vehicle system 210 may have a perception of the surrounding environment based on the perception data collected through one or more sensors in real-time and/or based on historical perception data stored in a vehicle model database.

In particular embodiments, the vehicle system 210 may take advantage of the full-stack of sensors to generate accurate perception and localization information related to the reference driving process. For example, the vehicle system 210 may be driven by a safety driver during a demonstration driving process with the full stack of sensors running in the background to collect vehicle driving data and generate training samples for human driving behaviors. This human driving behavior data may be used to train the trajectory planner on how to generate trajectories to navigate the vehicle. In particular embodiments, the human driving behavior data may be collected from a public road or in closed testing ground. For example, a number of relatively complex or dangerous situations (e.g., big trucks, curbs, pedestrians near the vehicle) may be setup in a closed testing ground to test how human drivers would handle these scenarios and collect the vehicle driving data related to handling these scenarios. In particular embodiments, the vehicle driving data collected by vehicle system 210 may include vehicle performance data related to the vehicle itself including, for example, but not limited to, vehicle speeds, moving directions, wheel directions, steering angles, steering force on the steering wheel, pressure of braking pedal, pressure on acceleration pedal, acceleration (e.g., acceleration along the moving direction and the lateral direction), rotation rates (e.g., based on IMU/gyroscope outputs), vehicle moving paths, turning radiuses, vehicle trajectories, locations (e.g., GPS coordinates), signal status (e.g., on-off states of turning signals, braking signals, emergence signals), disengagement data, human operation data, etc. In particular embodiments, the vehicle performance data may include navigation data of the vehicle, for example, a navigation map, a navigating target place, a route, an estimated time of arriving, a detour, etc.

In particular embodiments, while driving in an autonomous driving mode, the vehicle system 210 may encounter scenarios that are unknow to the system or are not supported by the trajectory planner for generating navigation trajectories (e.g., not included in the operation design domain). The vehicle system 210 may be disengaged from the autonomous driving mode manually by the safety driver or automatically by the vehicle system to allow the safety driver to take over the control. Once this happens, the vehicle system 210 may collect the vehicle driving data (e.g., steering angles, braking operations, trajectories, moving directions, velocities, accelerations, turning radiuses, etc.) and the related environment perception data. The vehicle system 210 may include the collected data in disengagement reports. For example, the vehicle system 210 may encounter scenarios, such as, nudging traffic, jaywalkers, flooded road surfaces, unknow or unidentifiable objects, narrow lanes shared by bicycle riders, etc. The vehicle system 210 may be disengaged from the autonomous driving mode and allow the safety driver to take over the control in response to a determination that these scenarios are not included in the operational design domain. The vehicle system 210 may monitor the vehicle performance, the vehicle environment and the operations of the safety driver and collect the vehicle driving data (e.g., vehicle performance data, driver operation data, perception data). The vehicle driving data may be included in a disengagement report and may be used to optimize the cost function weights of the trajectory planner.

In particular embodiments, the vehicle driving data (e.g., including vehicle performance data, driver operation data, and perception data) may be cleaned to make sure that the data covers a wide range of scenarios that are representative (e.g., with an overall statistic distribution) to all possible scenarios that could be encountered by AVs. The collected vehicle driving data may be associated with a number of scenarios encountered by the vehicle. The collected vehicle driving data may need to have a balanced data set corresponding to a wide range of representative scenarios (e.g., stop signs, lane changes, merging lanes, making a turn at an intersection, etc.) to avoid overfitting for a limited number of scenarios. The data cleaning may be performed by human engineers or machine-learning models. For example, a human labeler may identify the corner cases where the human driver sees very differently from the perception stack and to remove the noise data set from the collected data. As an example, the collected vehicle driving data may include perception data related to vehicle exhaust that appears to be an object as perceived by the perception algorithm (e.g., the vehicle exhaust being marked as an object using a bounding box by an object recognition algorithm or a machine-learning model). The human labeler may recognize the vehicle exhaust and remove this corner case from being used for optimizing the cost function weights of the trajectory planner. The human labeler may re-label this perception data as being related to the vehicle exhaust and the re-labeled data may be used to train the perception algorithm to correctly recognize the vehicle exhaust. As another example, the human labeler may identify illegal or danger human driving behaviors and may exclude the corresponding vehicle driving data from being used to optimize the cost function weights of the trajectory planner.

In particular embodiments, the vehicle driving data (e.g., vehicle performance data, driver operation data, and perception data) may be cleaned by a machine-learning model or a classification algorithm to make sure that the data covers a wide range of scenarios that are representative to all possible scenarios that could be encountered by AVs. For example, the classification and labelling results by the human labeler may be used to train a machine-learning model on how to classify and label the vehicle driving data. Then, vehicle driving data may be fed to that machine-learning model to identify the corner cases where the human driver sees very differently from the perception algorithm to remove the noise from the data set. As another example, the classification and labelling results by the human labeler may be used to generate one or more rules for a rule-based classification algorithm for classifying and labeling the vehicle driving data. Then, vehicle driving data may be fed to that classification algorithm to identify the corner cases where the human driver sees very differently from the perception algorithm and to remove the noise data set from the collected vehicle driving data.

In particular embodiments, the data cleaning process may be performed by the data cleaning module (e.g., 103 in FIG. 1) which cleans the vehicle driving data stored in the data collection and storage module (e.g., 103 in FIG. 1). The data cleaning module (e.g., 103 in FIG. 1) may access the data stored in the data collection and storage module (e.g., 103 in FIG. 1) to clean or remove the data related to unwanted corner cases. In particular embodiments, the data cleaning module (e.g., 103 in FIG. 1) may communicate with the reference trajectory generator (e.g., 110 in FIG. 1) to exclude the reference trajectories and constraints data related to unwanted corner cases. In particular embodiments, the collected perception data may have a relatively low quality (e.g., low resolution images with poor lighting conditions) and may be pre-processed (e.g., by an image pre-processing or enhancing algorithm, a machine-learning model trained specifically for low quality images) before being used to optimize the trajectory-evaluation function weights of the trajectory planner.

Figure 3A:
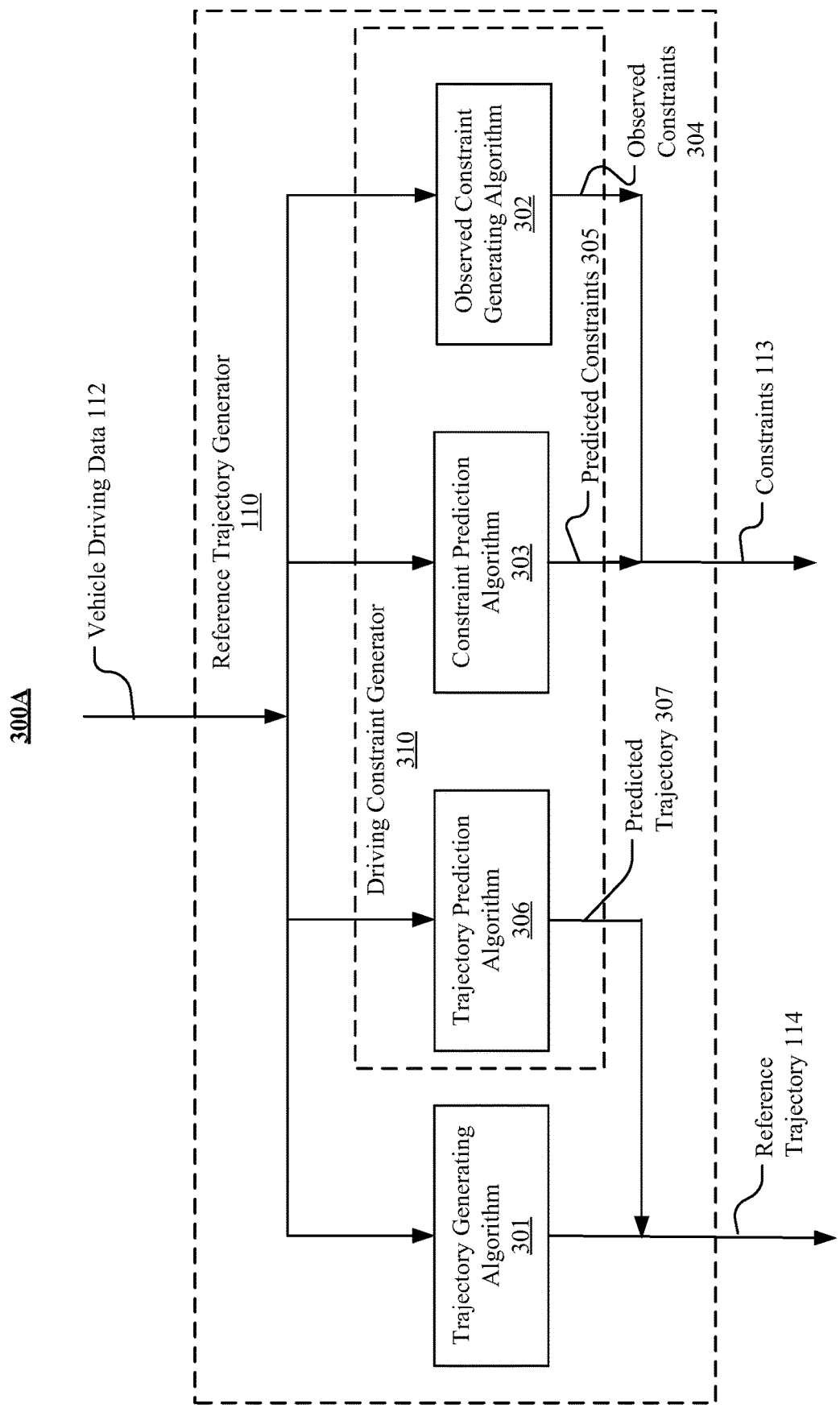
FIG. 3A illustrates an example reference trajectory generator for generating reference trajectories based on vehicle driving data and generating driving constraints based on corresponding perception data.

FIG. 3A illustrates an example reference trajectory generator 110 for generating reference trajectories based on vehicle driving data and generating driving constraints based on corresponding perception data. In particular embodiments, a vehicle trajectory (e.g., a human driving trajectory, a planned trajectory) may be or include a spatial-temporal moving path including a series of locations of the vehicle along the moving path and correspond to a particular time window (e.g., 100 points per 10 seconds). Each of the series of locations may be associated with a number of parameters including, for example, but not limited to, velocity, acceleration (along the moving path or the lateral direction), GPS coordinates, steering angles, braking paddle pressure, moving directions, etc. In particular embodiments, the reference trajectory generator 110 may include a trajectory generating algorithm 301 for generating the reference trajectory 114 (e.g., human-driven trajectories) based on the vehicle driving data of the vehicle. The trajectory generating algorithm 301 may extract information (e.g., steering angles, speeds, moving directions, locations, etc.) from the vehicle driving data and generate the human driving trajectory which has the same format with the output trajectory of the trajectory planner (e.g., 130 in FIG. 1) to allow the human driving trajectory to be directly compared to the output trajectory of the trajectory planner (e.g., 130 in FIG. 1). The perception data may include bird-view images or top-down images as perceived by the sensing systems (e.g., optical cameras, thermal cameras, LiDAR, radar). The system may use a perception algorithm (e.g., an object recognition algorithm) to recognize objects in the images and generate bounding boxes or polygons to represent these objects. The trajectory generating algorithm 301 may take the related information as inputs and generate the reference trajectory (e.g., the human driving trajectory) based on this input information. The vehicle trajectory may describe the motion of the vehicle in the three-dimensional space. The reference trajectory 114 generated by the reference trajectory generator 110 may be fed to the trajectory planner (e.g., 130 in FIG. 1) to be used as the ideal output of the trajectory planner (e.g., 130 in FIG. 1) for optimizing the cost function weights of the trajectory planner.

In particular embodiments, the reference trajectory generator 110 may include a driving constraint generator 310 for generating or determining driving constraints of the vehicle driving environment based on the associated perception data. The driving constraints may include information related to the boundary conditions in the driving environment that the trajectory planner would need for generating corresponding trajectories to automatically navigate the vehicle. In particular embodiments, the driving constraints may include, for example, but are not limited to, mapping information, obstacles, lane boundaries, other vehicles, pedestrians, bicycles, traffic rules, lanes, traffic signals, etc. For example, when another vehicle is moving in front of the AV, the trajectory planner of the AV may take that moving vehicle as a constraint and will avoid intersecting with its moving path. As another example, when the AV detects a lane boundary and a curb, the trajectory planner of the AV may need to take that lane boundary and curb as the driving constraints for generating the corresponding trajectories to navigate the vehicle. In particular embodiments, the generated driving constraints may be associated with a timestamp and may be used by the trajectory planner to generate the planned trajectories (during a cost function optimization process) for navigating the vehicle in accordance with this particular scenario. The generated constraints may be associated with a localization report related to the environment states for the next N seconds (e.g., 10 seconds or 40 seconds). The generated driving constraints may include snapshot information of the environment to allow the trajectory planner to generate and score trajectories. In short, the reference trajectory generator 110 may generate the inputs (e.g., constraints) needed for the trajectory planner to generate trajectories and the ideal output (e.g., the reference trajectory) of the trajectory planner to optimize the cost function weights.

In particular embodiments, the driving constraint generator 310 may include an algorithm 302 for generating observed driving constraints 304, a prediction algorithm 303 for determining predicted driving constraints 305, and a trajectory prediction algorithm 306 for determining predicted trajectory 307 for the vehicle itself. The observed driving constraints may correspond to the actual states of the surrounding environment as perceived by the human driver or/and the vehicle sensing system at particular time moments. The observed driving constraints may be determined based the corresponding perception data associated with the vehicle driving data (e.g., using object recognition algorithms, computer vision algorithms, machine-learning models, etc.). The predicted driving constraints may correspond to predicted states of the driving environment at the future moments (e.g., within a 10-second time window) with respect to a particular time moment. The predicted driving constraints may be determined by the constraint prediction algorithm 303 based on the previously observed driving constraints of the environment until this particular time moment or previous perception data until this particular time moment. In particular embodiments, the driving constraint generator 310 (including the observed constraints generating algorithm 302 and the constraint prediction algorithm 303) may be the same to the algorithm(s) that are used by the trajectory planner (e.g., 130 in FIG. 1) at run time for generating vehicle trajectory to navigate the AV in the autonomous driving mode. As a result, the driving constraint generator 310 may allow the trajectory planner (e.g., 130 in FIG. 1) to have the same inputs (e.g., the same data format and the same information) for generating and evaluating trajectories as it would have had when running on an AV platform and generating trajectories to navigate the AV in the autonomous driving mode. In particular embodiments, the driving constraint generator 310 may include a trajectory prediction algorithm 306 which cooperates with the constraint prediction algorithm 303 to determine the predicted trajectory 307 of the vehicle itself. The information related to the predicted trajectory 307 of the vehicle itself may be used to generate the reference trajectory 114.

Figure 3B:
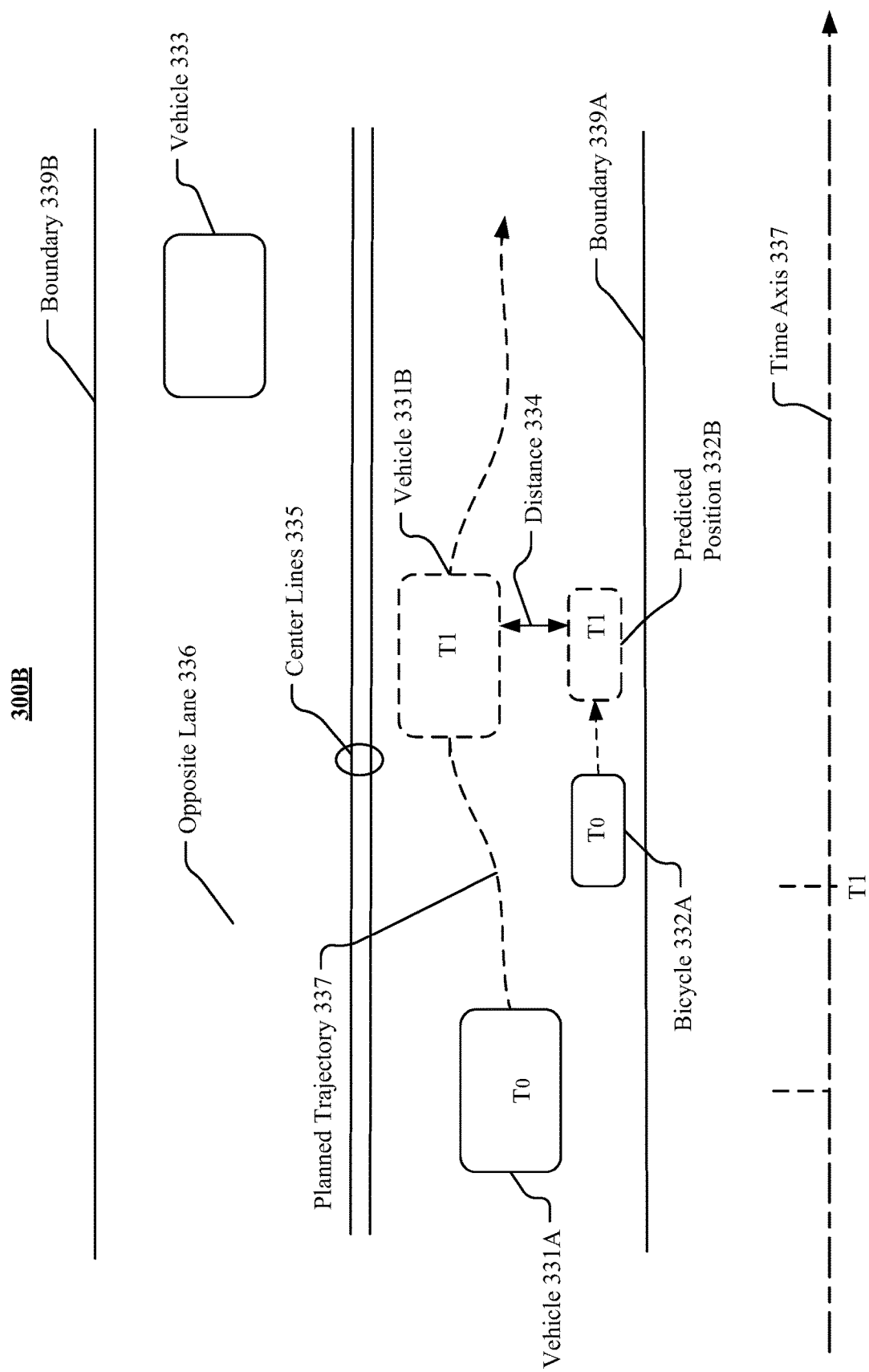
FIG. 3B illustrates an example process for determining observed constraints and predicted constraints.

FIG. 3B illustrates an example process 300B for determining observed constraints and predicted constraints. As an example and not by way of limitation, the human-driving data may include perception data which may include bird-view images for the driving environment of the vehicle. The perception data with the bird-view images may be fed to the driving constraint generator (e.g., 310 in FIG. 3A) which includes an observed constraint generating algorithm and a constraint prediction algorithm. The observed constraint generating algorithm may analyze the bird-view image of the perception data (e.g., using an object recognition algorithm or a machine-learning model) to determine that, at a particular time moment $T_0$, there is bicycle 332A sharing the same lane in front of the vehicle 331A. The observed constraint generating algorithm may determine that the vehicle 311A itself is located at a particular position (e.g., as shown by the vehicle position 311A) at the time moment $T_0$. The vehicle position 311A may be determined based on GPS coordinates, a map, or other localized perception data. The position of the bicycle 332A may be determined based on object recognition results based on the bird-view image (or LiDAR point cloud). The observed constraint generating algorithm may identify the bicycle 332A, determine its position (at the time moment $T_0$), and generate a bounding box to represent it. This information may be later fed to the trajectory planner as the driving constraints for generating navigating trajectories for the vehicle. For example, for generating a trajectory to navigate the vehicle 331A from the time moment $T_0$ until a later time moment $T_E$ (e.g., $T_E=T_0+$ 10 seconds), the trajectory planner may take the bicycles 313A and its position at the time moment $T_0$ as one of the driving constraints. The trajectory planner may generate a planned trajectory 337 to keep a safe distance 314 from the bicycle 331A. At the same time, the observed constraint generating algorithm may identify the center lines 335, the road boundaries 339A and 339B, the vehicle 333 in the opposite lane 336 from the bird-view image. The observed constraint generating algorithm may determine their respective positions and generate respective representations (e.g., bounding boxes, lines, etc.) to represent them as the observed driving constraints at the time moment $T_0$. As such, these observed driving constraints may correspond to the actual states (e.g., actual positions) of the driving environment at the time moment $T_0$.

In particular embodiments, the trajectory planner may generate a planned trajectory 337 to navigate the vehicle 331A from the time moment $T_0$ until a later time moment $T_E$ (e.g., $T_E=T_0+10$ seconds). The planned trajectory 337 may allow the vehicle 331A to keep a safety distance 334 from the bicycle 332A. However, to generate the planned trajectory 337, the trajectory planner may need to know the predicted position 332B of the bicycle 332A at the time moment $T_1$ when the vehicle 331A is passing the bicycle 332A. In other words, at the time moment $T_0$ to generate a planned trajectory to navigate the vehicle after the time moment $T_0$, the trajectory planner may not only need to know the actual states of the driving environment at the time moment $T_0$, the previous states of the driving environment before $T_0$, but also need to know the predicted states of the driving environment after the time moment $T_0$. In particular embodiments, the system may determine these predicted states (e.g., predicted constraints) of the driving environment based on the previous states of the driving environment as perceived by the vehicle's sensing system and captured in the perception data.

As an example and not by way of limitation, the system may use the constraint prediction algorithm (e.g., 303 in FIG. 3A) to predict a series of positions (including the predicted position 332B at $T_1$) for the bicycle 332A for a series of time moments after the $T_0$. The predicted series of positions of the bicycle 332A may be determined by the constraint prediction algorithm based on the current position at the time moment $T_0$, the moving direction and velocity of the bicycle 332A as determined based on the perception data before the time moment $T_0$, and other related information (e.g., rules of the lane). These predicted positions may be fed to the trajectory planner as the predicted driving constraints for generating the planned trajectory 337 for navigating the vehicle 331A. It is notable that the constraint prediction algorithm 303 and the observed constrain generating algorithm 302 may be the same to the algorithms that are used by the trajectory planner at run time for generating trajectories to navigate the AV in the autonomous driving mode. As such, the driving constraints (including the observed constraints and the predicted constraints) as determined by the driving constraint generator 310 and fed to the trajectory planner may be the same inputs that the trajectory planner would have had when running on the AV platform to navigate the vehicle in the autonomous driving mode.

Figure 3C:
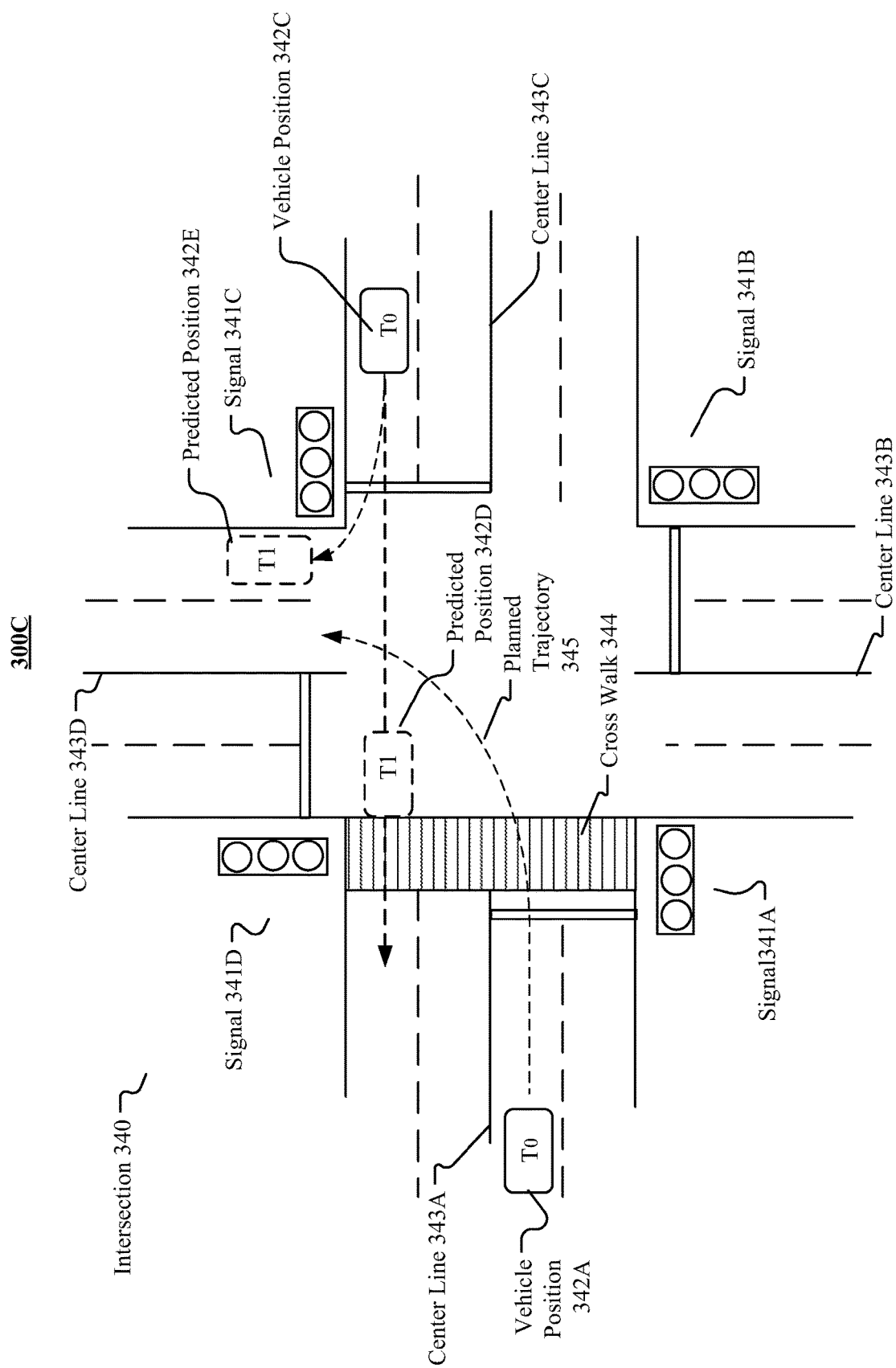
FIG. 3C illustrates an example process for determining a planned trajectory based on observed constraints and predicted constraints.

FIG. 3C illustrates an example process 300C for determining a planned trajectory based on observed constraints and predicted constraints. As an example and not by way of limitation, the perception data may include a bird-view image of an intersection 340 when the vehicle 342A is approaching the intersection 340 and needs to make a left turn. The perception data may be fed to the driving constraint generator (e.g., 310 in FIG. 3A) which may analyze the perception data to generate the driving constraints. For example, the system may use the observed constraint generating algorithm to determine, at a time moment $T_0$, the actual positions of the vehicle itself (e.g., the vehicle position 342A), the actual positions of other vehicles (e.g., the vehicle position 342C), the positions of the center lines (e.g., 343A, 343B, 343C, and 343D), the positions of the traffic signals (e.g., 341A, 341B, 341C, and 341D), the position of the cross walk 344, etc. The actual position of the vehicle itself may be determined based on associated GPS coordinates, a map, localized perception data, etc. The system may use an object recognition algorithm or a pattern recognition algorithm to determine, for the time moment $T_0$, the actual positions of other vehicles (e.g., 342A), the center lines (e.g., 343A, 343B, 343C, and 343D), the status of traffic signal (e.g., 341A, 341B, 341C, and 341D) and the cross walk 344. The system may generate corresponding representations (e.g., bounding boxes, lines, polygons, etc.) to represent these objects or status. The system may determine one or more traffic rules (e.g., yield to oncoming traffic for left-turn on green light) based on perception data or map data. Then, the system may use the constraint prediction algorithm (e.g., 304 in FIG. 3A) to determine predicted states in the vehicle driving environment. These observed constraints and the predicted constraints may be fed to the trajectory planner to generate the planned trajectory for navigating the vehicle. For example, the constraint prediction algorithm may predict, at a time moment $T_1$ which is after $T_0$, the vehicle in the opposite lane will drive straight forward and will be at a predicted position 342D. The trajectory planner may generate a planned trajectory 345 that will not intersect with the predicted vehicle position 342D. As another example, the constraint prediction algorithm may predict, at a time moment $T_1$ which is after $T_0$, the vehicle in the opposite lane will make a right turn and will be at a predicted position 342E. The trajectory planner may generate the planned trajectory 345 that will not interest with the predicted moving path of the vehicle 342C.

Figure 3D:
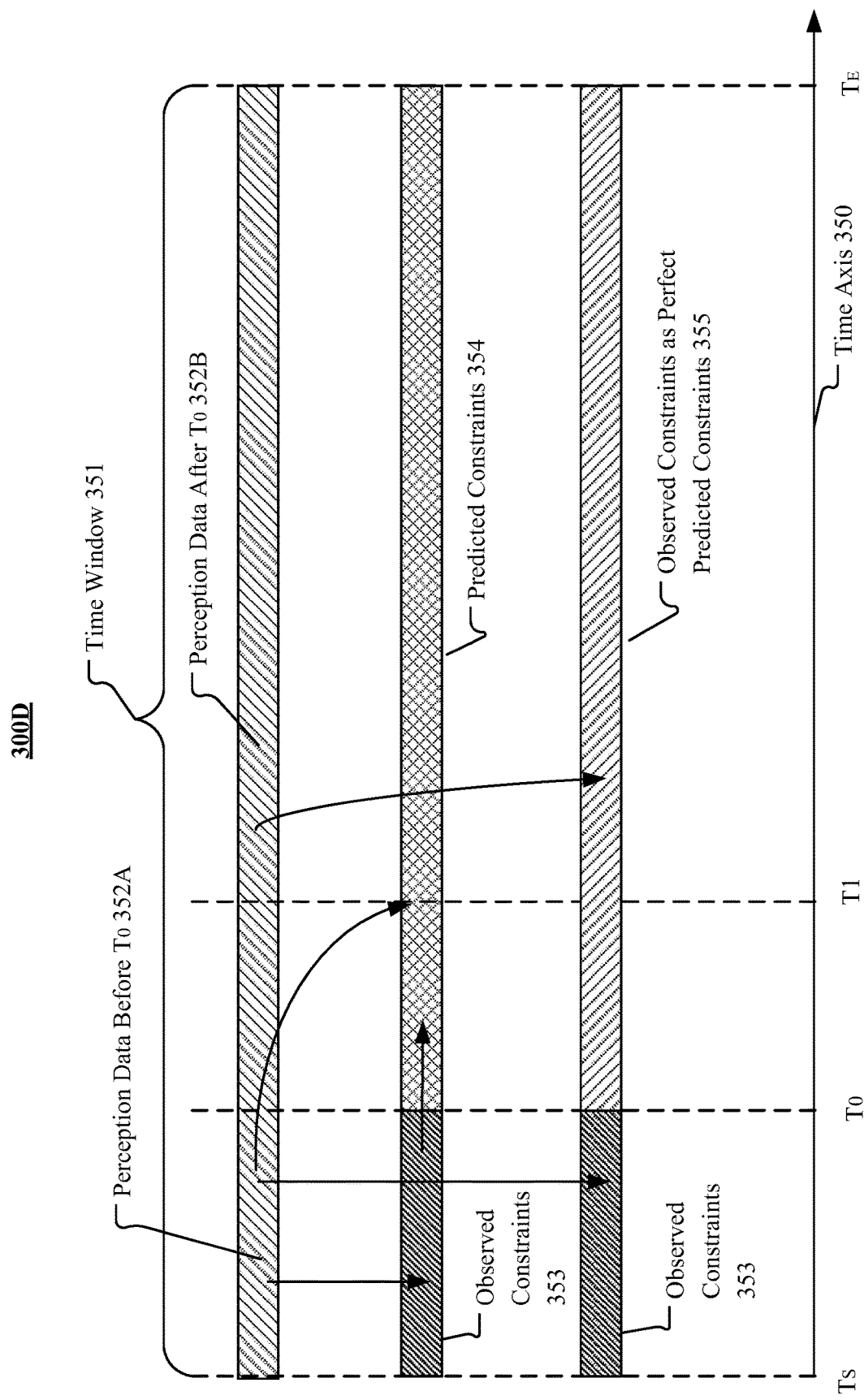
FIG. 3D illustrates an example diagram showing correspondence between perception data and different types of driving constraints.

FIG. 3D illustrates an example diagram 300D showing correspondence between perception data and different types of driving constraints. In particular embodiments, the collected vehicle driving data may include perception data (e.g., 352A and 352B) of the driving environment over a time window from $T_S$ to $T_E$ (e.g., a 10-second time window, a 40-second time window) corresponding to a process for the vehicle moves from the point A to point B (not shown). The vehicle driving data including the perception data (e.g., 352A and 352B) may be fed to the driving constraint generator to generate the observed driving constraints and predicted driving constraints. In particular embodiments, for a time moment $T_0$, the observed driving constraints 353 may be determined by an observed constraint generating algorithm based on the perception data 352A corresponding to time at and prior to the time moment $T_0$ (including $T_0$). The predicted driving constraints 354 may be determined by a constraint prediction algorithm based on the perception data 352A corresponding to time prior to the time moment $T_0$ (including $T_0$) or based on the observed driving constraints 353 at or/and prior to the time moment $T_0$. In particular embodiments, instead of feeding the predicted constraints 354 to the trajectory planner for generating planned trajectories, the system may determine the observed constraints 355 for the time after the time moment $T_0$ based on the corresponding perception data 352B and feed these observed constraints 355 corresponding to the time after the time moment $T_0$ to the trajectory planner as the ground truth constraints of the predicted constraints. In particular embodiments, the system may feed the predicted constraints 354 corresponding to the time after the time moment $T_0$ and the observed constrains 353 corresponding to the time before the time moment $T_0$ to the trajectory planner to generate a first version of planned trajectory. Then, the system may feed the ground truth constraints 355 corresponding to the time after the time moment $T_0$ and the observed constraints 353 corresponding to the time before the time moment $T_0$ to the trajectory planner to generate a second version of planned trajectory. After that, the system may compare the two versions of planned trajectories and use the comparison result to optimize the constraint prediction algorithm or/and the cost function weights of the trajectory planner.

In particular embodiments, a vehicle trajectory (e.g., a human driving trajectory, a planned trajectory, a candidate trajectory) may describe the motion of the vehicle in the three-dimensional space. The vehicle trajectory may be or include a vehicle moving path including a series of spatial-temporal points (x, y, t). Each of the spatial-temporal point (x, y, t) may indicate a location of the vehicle along the moving path at a particular time moment. The whole trajectory may correspond to a particular time window and may have a particular point density over time (e.g., 100 points per 10 seconds). Each of the spatial-temporal point (x, y, t) may be associated with a number of parameters including, for example, but not limited to, velocity, acceleration (e.g., along a moving direction or a lateral direction), GPS coordinates, steering angles, braking paddle pressure, moving directions, etc.

Figure 4A:
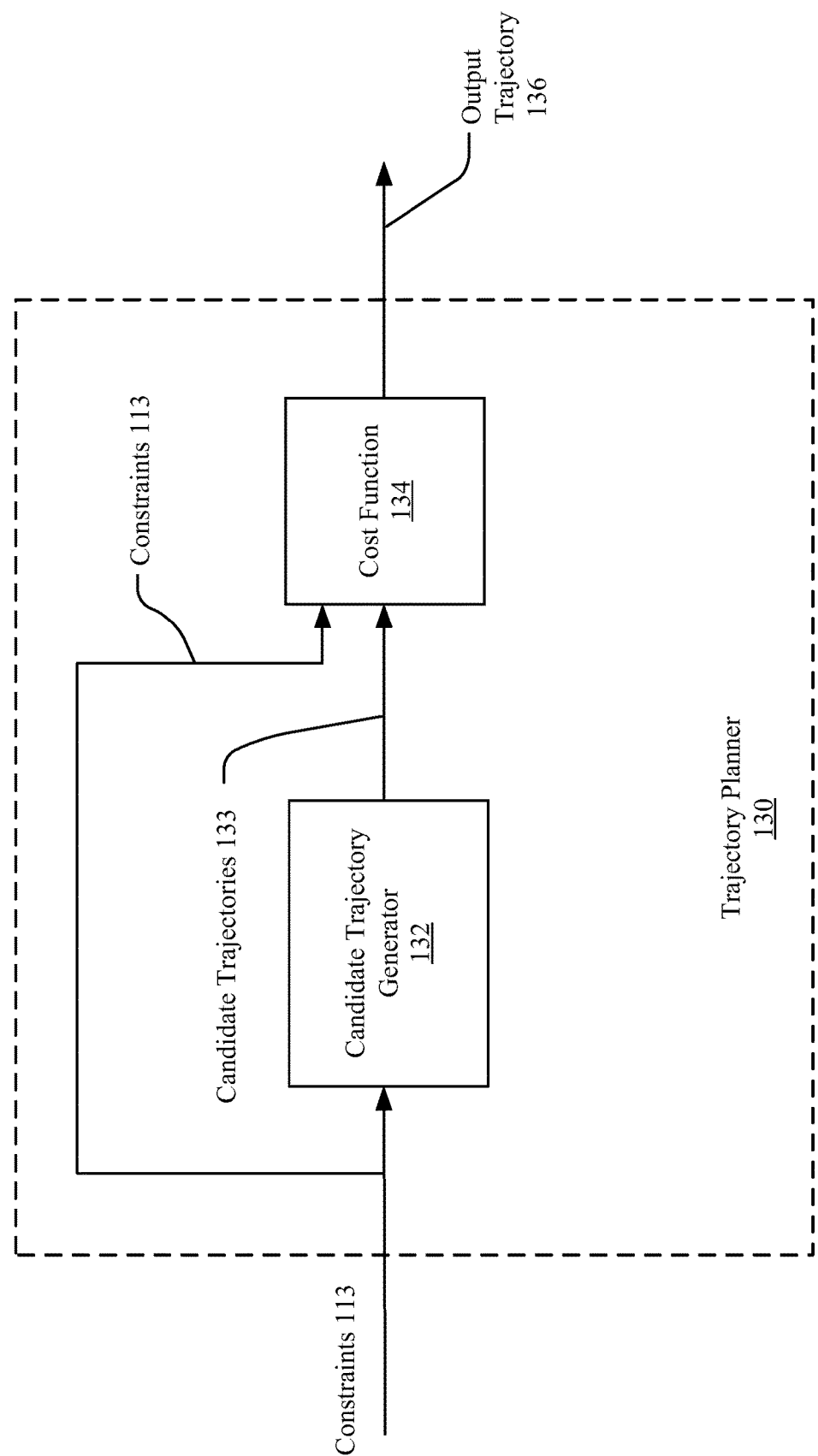
FIG. 4A illustrates an example diagram of a trajectory planner for generating trajectories to navigate the vehicle

FIG. 4A illustrates an example diagram 400A of a trajectory planner 130 for generating trajectories to navigate the vehicle. In particular embodiments, the trajectory planner 130 may include a candidate trajectory generator 132 for generating candidate trajectories and a trajectory-evaluation function (e.g., the cost function 134) for evaluating the candidate trajectories and select the output trajectory 136 based on the evaluation result. In particular embodiments, the candidate trajectory generator 132 may generate a number of candidate trajectories based on the driving constraints 113 (including observed constraints and predicted constraints) received from the reference trajectory generator. The generated candidate trajectories 133 and the corresponding driving constraints 113 may be fed to the cost function 134 which evaluates/ranks the candidate trajectories based on a number of cost terms (also referred to as input terms) and a number of weights associated with these cost terms. The system may use the cost function 134 to determine a cost value (also referred to as a total cost in later sections of this disclosure) for each candidate trajectory being evaluated and select the output trajectory 136 based on the cost values. As an example and not by way of limitation, the cost function 134 may have a number of cost terms each associated with a weight. The system may use the cost function 134 to determine, for each evaluated candidate trajectory, a cost value based on the cost terms and the associated weights by summing up all cost terms as weighted by corresponding weights. Then, the system may rank all evaluated candidate trajectories based on corresponding cost values and select the candidate trajectory that has the lowest cost value as the output trajectory 136.

In particular embodiments, the system may use one or more trajectory-evaluation functions (e.g., cost functions) to evaluate candidate trajectories. For example, the system may use a cost function to determine a cost for each candidate trajectory being evaluated. In particular embodiments, the "cost" of a candidate trajectory may refer to a quantified mathematical metric indicating the level of desirability based on a penalty associated with the use of that candidate trajectory for navigating the vehicle. A higher cost may indicate a lower level of desirability attributed to a higher penalty for the associated candidate trajectory to be used for navigating the vehicle. A lower lost may indicate a higher level of desirability attributed to a lower penalty for the associated candidate trajectory to be used for navigating the vehicle. A cost function may be a mathematical function to determine the cost value based on the cost function inputs (e.g., difference vectors of particular parameters, cost terms corresponding to different parameters). In particular embodiments, the cost function used for determining the cost may be a linear sum function. For example, the cost function for determine the cost of the evaluated trajectory based on a particular parameter may be a linear sum function for summing up the difference between the expected values (e.g., as determined based on the evaluated trajectory) and idealized values (e.g., as determined based on a reference model) of the particular parameter. As another example, the cost function for determining the total cost (also referred to as total cost function or overall cost function) of the evaluated trajectory may be sum function for summing up a number of cost terms as weighted by corresponding weights. In some examples, a maneuver associated with a high cost may be attributed to that which a human driver would be unlikely to perform due to impact on driving comfort, perceived safety, etc., whereas a maneuver associated with a lower cost may be attributed to that which a human would be more likely to perform.

Figure 4B:
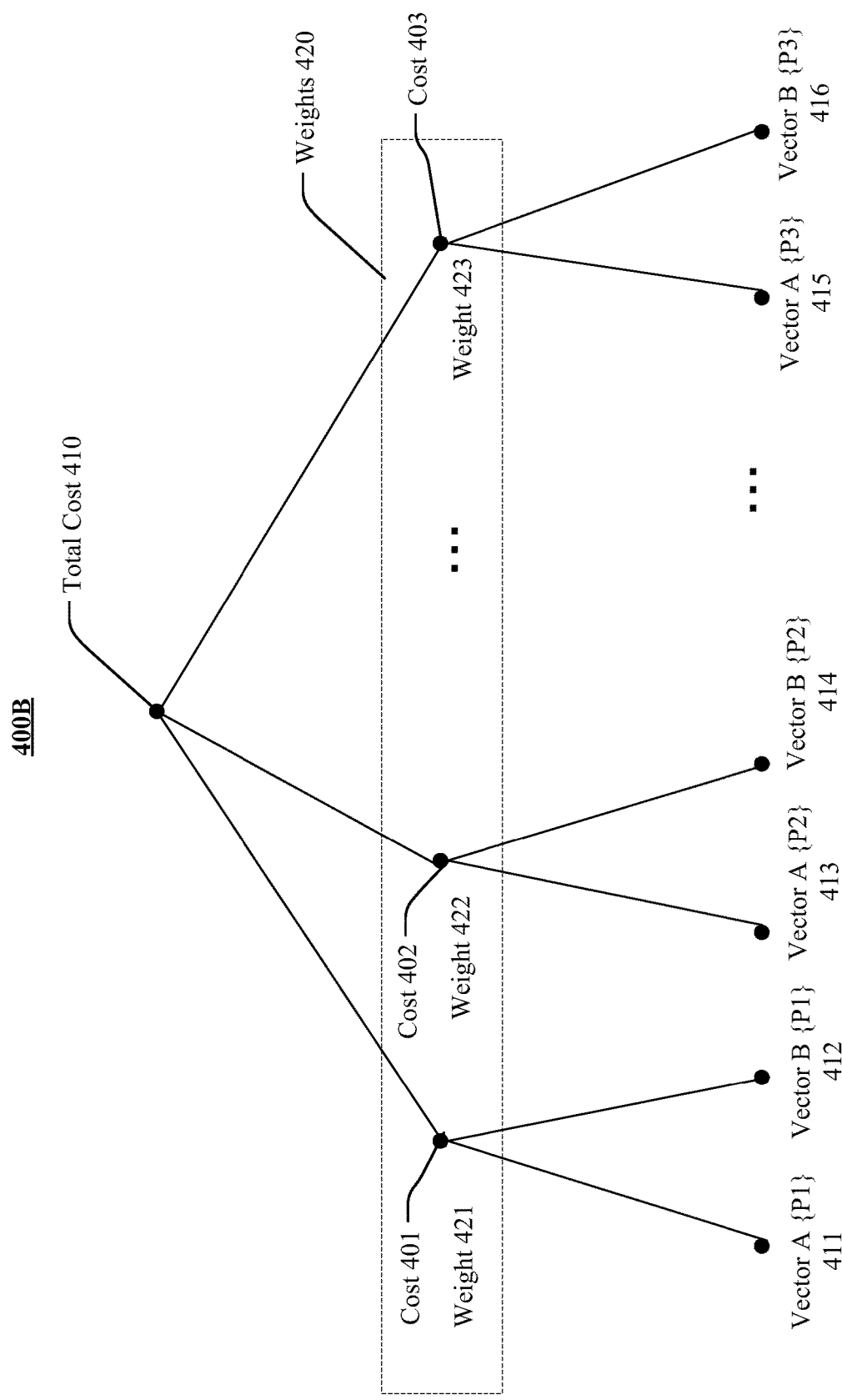
FIG. 4B illustrates an example process for determining a total cost for an evaluated trajectory.

In particular embodiments, each trajectory being evaluated may be associated with a number of parameters including, for example, but not limited to, a distance to a closest obstacle, a distance to another obstacle, a distance to a lead vehicle, a relative speed to a lead vehicle, a distance to a lane boundary, a difference between the trajectory speed and a speed limit, a maximum jerk, a maximum acceleration, a vehicle steering angle, a vehicle position, etc. The system may determine, for a candidate trajectory being evaluated, a cost based on a particular parameter (e.g., a distance to a closest obstacle, a distance to a lane boundary, a difference between trajectory speeds and a speed limit, a maximum jerk, a maximum acceleration). For example, the system may determine a first cost for a candidate trajectory based on the distance to the closest obstacle and determine a second cost for the candidate trajectory based on the maximum acceleration. In particular embodiment, the candidate trajectory being evaluated may have multiple costs determined based on respective parameters (each corresponding to a cost term to the total cost function for determining the total cost of the evaluated candidate trajectory). The system may use a total cost function to determine a total cost for the evaluated candidate trajectory based on the costs determined based on respective parameters (cost terms), as illustrated in FIG. 4B and described in later section of this disclosure. The cost function for determining the total cost for the evaluated trajectory may have a number of cost terms (corresponding to the cost values determined based on respective parameters) as weighted a number of weights (e.g., a weight per cost term). In particular embodiments, he cost terms may include, for example, but are not limited to, a distance to a closest obstacle, a distance to another obstacle, a distance to a lead vehicle, a relative speed to a lead vehicle, a distance to a lane boundary, a difference between the trajectory speed and a speed limit, a maximum jerk, a maximum acceleration, a vehicle steering angle, a vehicle position, etc.

In particular embodiments, the system may use one or more trajectory-evaluation functions (e.g., cost functions) each being associated with a particular trajectory parameter (e.g., velocity, acceleration, position, distance to lane boundary, distance to a closest object, etc.) to evaluate a trajectory with respect to an expected trajectory (e.g., generated from a reference model or previous driving data for a particular scenario). As an example and not by way of limitation, the system may select velocity as the parameter for evaluating a trajectory associated with a particular scenario in the driving environment. The system may determine, for the evaluated trajectory, a first vector including a series of velocity values over a series of pre-determined time moments along the trajectory. Then, the system may generate an expected trajectory or an ideal trajectory for this scenario using a scenario model or previous vehicle driving data associated with the scenario. Then, the system may determine, for the ideal trajectory, a second vector including a series of velocity values over the same series of pre-determined time moments (the same to the first vector of the evaluated trajectory). After that, the system may determine a difference between each vector element in the first vector and a corresponding vector element in the second vector. Then, the system may use the cost function to sum up all the difference values to calculate a cost for the evaluated trajectory. The cost of the evaluated trajectory may indicate an overall similarity level or an overall disparity level between the evaluated trajectory and the ideal trajectory as measured in the aspect of velocity.

In particular embodiments, a candidate trajectory may be evaluated in many aspects based on corresponding parameters including, for example, but not limited to, velocity, acceleration, positions, distance to a closest object (e.g., a leading vehicle, an obstacle), distance to a lane boundary, difference between trajectory speeds and corresponding speed limits, a maximum jerk metric, a maximum acceleration, turning radius, closest distance to obstacles, traversed distance, etc. The system may determine a number of cost values for the evaluated trajectory based on the selected parameters. Each cost value determined based on a particular parameter may indicate a similarity level or a disparity level of the evaluated trajectory with respect to an ideal trajectory (as determined by a reference model of this scenario) as measured by that particular parameter. In particular embodiments, the system may identify a number of cost terms corresponding to these selected parameters as inputs for an overall cost function. The overall cost function may have a number of weights for these cost terms (e.g., a weight for each cost term) and may be used to determine a total cost for the evaluated trajectory based on these cost terms and the corresponding weights by summing up all the cost terms as weighted by corresponding weights.

FIG. 4B illustrates an example process 400B for determining a total cost for an evaluated trajectory. As an example and not by way of limitation, the system may determine a number of cost terms corresponding to a number of parameters (e.g., $P_1$, $P_2$, $P_3$) associated with the evaluated trajectory. For each cost term, the system may determine a corresponding vector (e.g., vector 411 for $P_1$, vector 413 for $P_2$, vector 415 for $P_3$) for the evaluated trajectory. Then, the system may identify the scenario associated with the evaluated trajectory and access a reference model associated with this scenario. Then, the system may determine an ideal trajectory based on the reference model associated with this scenario. After that, for each cost term, the system may determine a vector (e.g., vector 412 for $P_1$, vector 414 for $P_2$, vector 414 for $P_3$) for the ideal trajectory. Then, the system may calculate a cost associated for the evaluated trajectory based on each cost term (e.g., 401 for $P_1$, 402 for $P_2$, 403 for $P_3$). For example, the system may compare the corresponding elements of the vectors 411 and 412 to determine the difference of corresponding elements. Then, the system may determine the cost 401 by summing up the difference of all vector elements. As another example, the system may compare the corresponding elements of the vectors 413 and 413 to determine the difference of corresponding elements. Then, the system may determine the cost 402 by summing up the difference of all vector elements. As another example, the system may compare the corresponding elements of the vectors 415 and 416 to determine the difference of corresponding elements. Then, the system may determine the cost 403 by summing up the difference of all vector elements. After that, the system may determine the total cost 410 of the evaluated trajectory by summing up the costs determined based on respective cost terms as weighted by respective weights (e.g., weights 421, 422, and 423). The total cost 410 may indicate an overall similarity level or disparity level of the evaluated trajectory with respect to the ideal trajectory determined based on a reference model associated with this scenario.

Figure 4C:
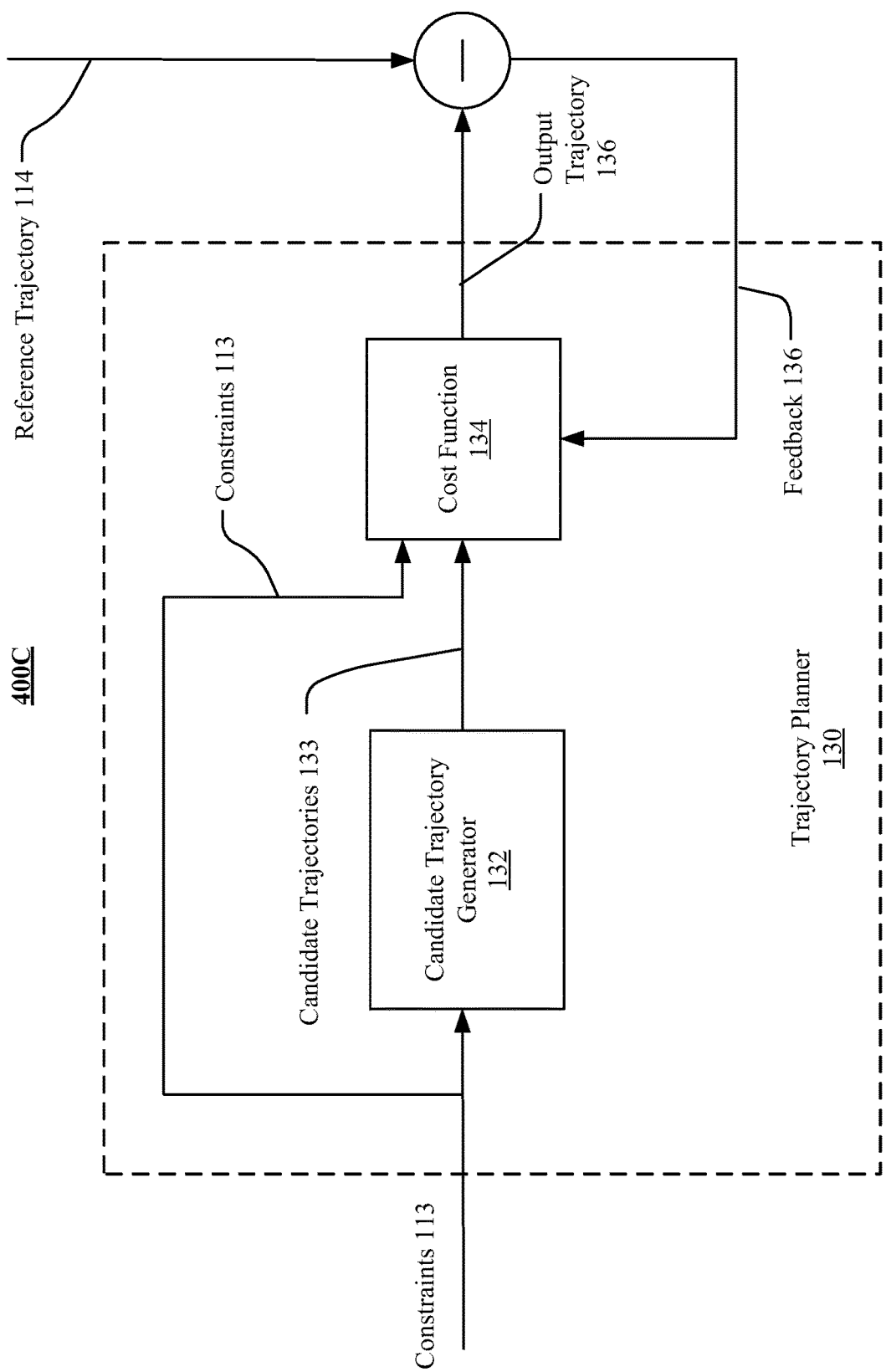
FIG. 4C illustrates an example process for tuning weights of cost terms of a cost function based on human driving trajectories.

FIG. 4C illustrates an example process 400C for tuning weights of cost terms of a cost function based on human driving trajectories. In particular embodiments, the total cost of the evaluated trajectory may be determined based on a number of weights associated with the cost terms. Each weight value may indicate a relative importance level of an associated cost term for determining the total cost of the evaluated trajectory. To make the output trajectory to mimic the human-driving trajectories, the system may need to appropriately balance these weights. Tuning these weights by human engineers could be inefficient and time-consuming. In particular embodiments, the system may use the framework 100 as illustrated in FIG. 1 and the process 400C as shown in FIG. 4C to automatically tune the weights associated with the cost terms of the cost function to allow the trajectory planner to learn how to balance these factors like human drivers. As an example and not by way of limitation, the trajectory planner 130 may receive the constraints 113 and the reference trajectory 114 from a reference trajectory generator. The reference trajectory 114 may be a human driving trajectory generated by the reference trajectory generator based on vehicle driving data (e.g., GPS data, motion data, etc.). The system may use the candidate trajectory generator 132 of the trajectory planner 130 to generate a number of candidate trajectories 133 based on the received constraints 113. Then, the candidate trajectories 133 and the constraints 113 may be fed to the cost function 134 which may evaluate each of the candidate trajectories 133 based on a number of cost terms, a number of corresponding weights, and the constraint 113. The weights of the cost function 134 may each have an initial value. The cost function 134 may use the weights with corresponding initial values to determine a total cost value for each of the evaluated candidate trajectory. Then, the system may select the candidate trajectory having the lowest cost value as the output trajectory 136. After that, the system may compare the output trajectory 136, which is selected based on the weights with the initial values, to the reference trajectory 114 (e.g., the human driving trajectory). Then, the system may send feedback information 136 to the cost function to adjust one or more weights of the cost function based on the comparison result between the output trajectory 136 and the reference trajectory 114. This process may be repeated (e.g., by feeding the trajectory planner more constraint data and reference trajectories) until the output trajectory 136 of the trajectory planner 130 matches the human driving trajectories.

In particular embodiments, the system may use a regression and classification method (e.g., a gradient descent algorithm) to tune the cost function weights based on the human driving behaviors (as represented by the human driving trajectories). In particular embodiments, the system may manipulate the weights to allow the human driving trajectory to be the lowest cost trajectory. In particular embodiments, the system may adjust the weighs to allow the trajectory that is the most similar (e.g., measured by one or more parameters such as speed or distance) to the human driving trajectory to have the lowest cost value. In particular embodiments, the system may determine each individual feature vector along the human driving trajectory and adjust the weights in a way that allow the output trajectory to match the distribution of each feature vector of the human driving trajectory. In particular embodiments, the system may analyze candidate trajectories that are very similar in terms of feature vectors, and determine their difference as measured by position errors to train a classification algorithm which optimizes the weights accordingly.

In particular embodiments, the system may determine a vector based on each parameter (corresponding to a cost term of the cost function) for the evaluated trajectory (without using the ideal trajectory determined based on the reference model). As an example and not by way of limitation, the system may determine a set of pairs {human_trajectory, planner_trajectory}$_i$ for the human driving trajectory and the output trajectory of the trajectory planner with the current weights (where i is an index of the series of points of the trajectory). Then, the system may determine a number of features or parameters for evaluating the output trajectory of the trajectory planner. The features or parameters may include, for example, but are not limited to, velocity, acceleration, positions, distance to a closest object (e.g., a leading vehicle, an obstacle), distance to a lane boundary, difference between trajectory speeds and corresponding speed limits, a maximum jerk metric, a maximum acceleration, turning radius, closest distance to obstacles, traversed distance, etc. Then, the system may determine a vector pair for each of the selected features or parameters (e.g., {features$_{human\_trajectory}$, features$_{planner\_trajectory}$}$_i$). After that, the system may adjust the weight values in a weight vector to allow the weighted feature vector for the human driving trajectory to have a lower cost than the weighted feature vector of all candidate trajectories generated by the trajectory planner.

In particular embodiments, the system may test and evaluate the trajectory planner with the adjusted weights using a simulated validation platform or an actual vehicle test platform. For example, the trajectory planner may be tested to run 10K miles in the simulation engine or on a testing platform on open road to evaluate the vehicle performance. The system may determine one more performance metrics for evaluating the trajectory planner. For example, the system may determine a driving safety metric (e.g., closest distances to obstacles and boundary lines) to indicate the degree of safety and a driving comfort metric (e.g., acceleration profiles for stop signs, lateral acceleration during driving, turning radiuses, etc.) to indicate the comfort level for riding passengers. The system may identify one or more scenarios that are not well handled by the trajectory planner based on the driving safety metric and the driving comfort metric (e.g., being below respective thresholds) and send feedback information to the optimization pipeline to cause more vehicle driving data related to these identified scenarios to be fed to the optimization pipeline. For example, the system may determine that the trajectory planner handles turning well but couldn't keep the safe distance for nudging when the vehicle is approaching a bicycle. The system may determine that the trajectory planner cannot yet handle the nudging scenario well. The system may send feedback information to the optimization pipeline to cause more nudging data to be fed to the optimization pipeline. The system may access the database to access and retrieve more nudging data (if any) and feed this data to the optimization pipeline. Or, the system ma send feedback information to the data collection process to collect more vehicle driving data related to nudging scenario. Then, the system may feed more nudging data to the optimization pipeline to further optimize the cost function weights of the trajectory planner based on the vehicle driving data related to nudging scenarios. The optimization process may be repeated to adjust the cost function weights of the trajectory planner until the trajectory planner meets the validation criteria (e.g., meeting criteria for the safety metric and comfort metric) with the output trajectory matching human driving trajectories.

Figure 5:
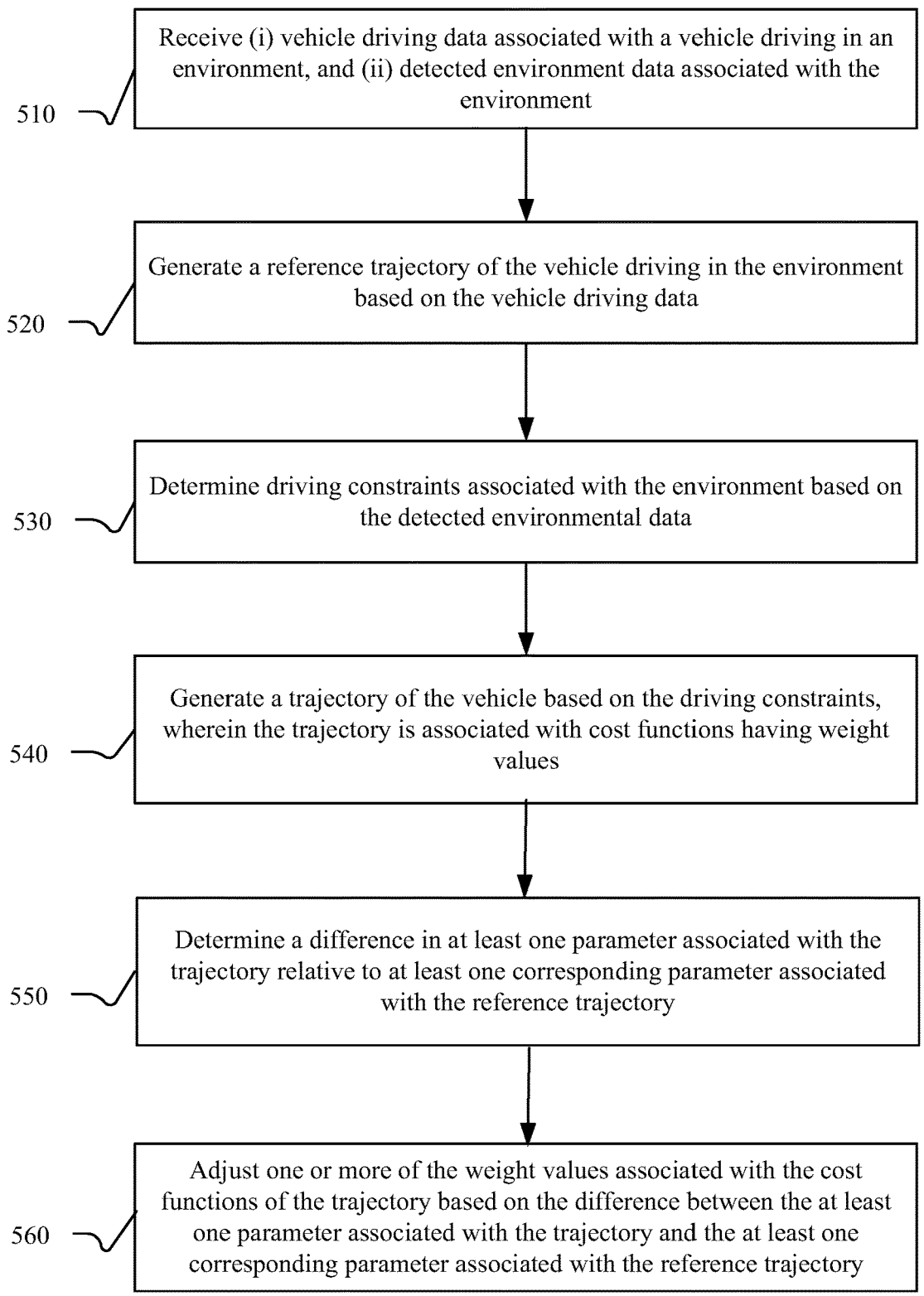
FIG. 5 illustrates an example method for adjusting one or more weights associated with cost function cost terms of a trajectory planner based on human driving behaviors.

FIG. 5 illustrates an example method 500 for adjusting one or more weights associated with cost function cost terms of a trajectory planner based on human driving behaviors. In particular embodiments, the method may begin at step 510, where a computing system may receive (i) vehicle driving data associated with a vehicle driving in an environment, and (ii) detected environment data associated with the environment. At step 520, the system may generate a reference trajectory of the vehicle driving in the environment based on the vehicle driving data. At step 530, the system may determine driving constraints associated with the environment based on the detected environmental data. At step 540, the system may generate a trajectory of the vehicle based on the driving constraints. The trajectory may be associated with cost functions having weight values. At step 550, the system may determine a difference in at least one parameter associated with the trajectory relative to at least one corresponding parameter associated with the reference trajectory. At step 560, the system may adjust one or more of the weight values associated with the cost functions of the trajectory based on the difference between the at least one parameter associated with the trajectory and the at least one corresponding parameter associated with the reference trajectory.

In particular embodiments, the driving constraints of the environment may include at least one of observed driving constraints and predicted driving constraints. The observed constraints may correspond to actual states of the environment with respect to a reference time moment. The predicted constraints may correspond to predicted states of the environment at future time moments with respect to the reference time moment. In particular embodiments, the trajectory may be generated based on the driving constraints comprising the observed driving constraints corresponding to a first time before the reference time moment and the predicted driving constraints of the environment corresponding to a second time after the reference time moment. The predicted constraints may be determined by a first constraint prediction algorithm that is the same to a second constraint prediction algorithm used by the trajectory generator at run time for generating trajectories to navigate the vehicle in an autonomous driving mode. In particular embodiments, the predicted constraints may include one or more of: a predicted trajectory of an agent in the environment, a predicted position of an agent in the environment, a predicted moving direction of an agent in the environment, a predicted velocity of an agent in the environment, a predicted trajectory of the vehicle in the environment, a predicted position of the vehicle in the environment, a predicted moving direction of the vehicle in the environment, or a predicted velocity of the vehicle in the environment. In particular embodiments, the observed constraints may include first observed constraints corresponding to a first time before the reference time moment and second observed constraints corresponding to a second time after the reference time moment. The system may generate a new trajectory based on the first observed constraints corresponding to the first time before the reference time moment and the second observed constraints corresponding to the second time after the reference time moment. The system may compare the new trajectory to the trajectory of the vehicle. The system may adjust one or more weight values associated with the trajectory planner for generating the new trajectory based on a comparison between the trajectory and the new trajectory.

In particular embodiments, the trajectory generator may generate a number of candidate trajectories based on the driving constraints of the environment. The trajectory may be selected from one of the candidate trajectories based on an associated cost function. In particular embodiments, the associated cost function may be associated with a number of cost terms. Each cost term may be associated with a weight indicating a relative importance level of that cost term. In particular embodiments, the cost terms of the cost function may include one or more of: a distance to a closest obstacle, a distance to a lane boundary, a distance to a lead vehicle, a relative speed with respect to a lead vehicle, a difference between a trajectory speed and a speed limit, a maximum jerk, a maximum acceleration, a vehicle steering angle, a vehicle position, or a factor representing safety and comfort of a vehicle trajectory. In particular embodiments, the trajectory may be selected from the candidate trajectories based on a trajectory-evaluation metric determined using the associated cost function based on the cost terms and the weights. In particular embodiments, the trajectory-evaluation metric may be a sum of the cost terms as weighted by respective weights. The associated cost function may be a sum function. In particular embodiments, the associated cost function with the adjusted one or more weights may allow the reference trajectory to have a minimum trajectory-evaluation metric value. In particular embodiments, the associated cost function with the adjusted one or more weights may allow a candidate trajectory that is most similar to the reference trajectory to have a smallest trajectory-evaluation metric value among the candidate trajectories. In particular embodiments, the associated cost function with the adjusted one or more weights may allow a candidate trajectory having a feature vector that matches a distribution of a corresponding feature vector of the reference trajectory to have a smallest trajectory-evaluation metric value among the candidate trajectories. In particular embodiments, the associated cost function with the adjusted one or more weights may allow a candidate trajectory having a minimum position-error vector with respect to the reference trajectory to have a smallest trajectory-evaluation metric value among the candidate trajectories.

In particular embodiments, the one or more weights may be adjusted using a gradient descent algorithm based on the vehicle driving data associated to a number of scenarios of the environment. In particular embodiments, the system may generate a number of new trajectories based on the vehicle driving data and the adjusted one or more weights. The system may evaluate vehicle performance based on the new trajectories using a simulation platform or a testing vehicle platform. The system may identify one or more first scenarios under which the vehicle performance fails to meet one or more pre-determined criteria. In particular embodiments, the system may send feedback information to a data collection module to collect new vehicle driving data associated with the one or more first scenarios. The system may feed the new vehicle driving data associated with the one or more first scenarios to an optimization pipeline to further adjust one or more weights of the trajectory generator. In particular embodiments, the reference trajectory may be determined by a reference trajectory generator based on vehicle driving data of the vehicle. The reference trajectory may have a same format with the trajectory generated by the trajectory generator. In particular embodiments, the system may generate a time-aggregated snapshot of the environment based on the environment data associated with the environment. The trajectory of the vehicle may be generated based on at least one the time-aggregated snapshot of the environment.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for adjusting one or more weights associated with the trajectory planner based on human driving behaviors including the particular steps of the method of FIG. 5, this disclosure contemplates any suitable method for adjusting one or more weights associated with the trajectory planner based on human driving behaviors including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
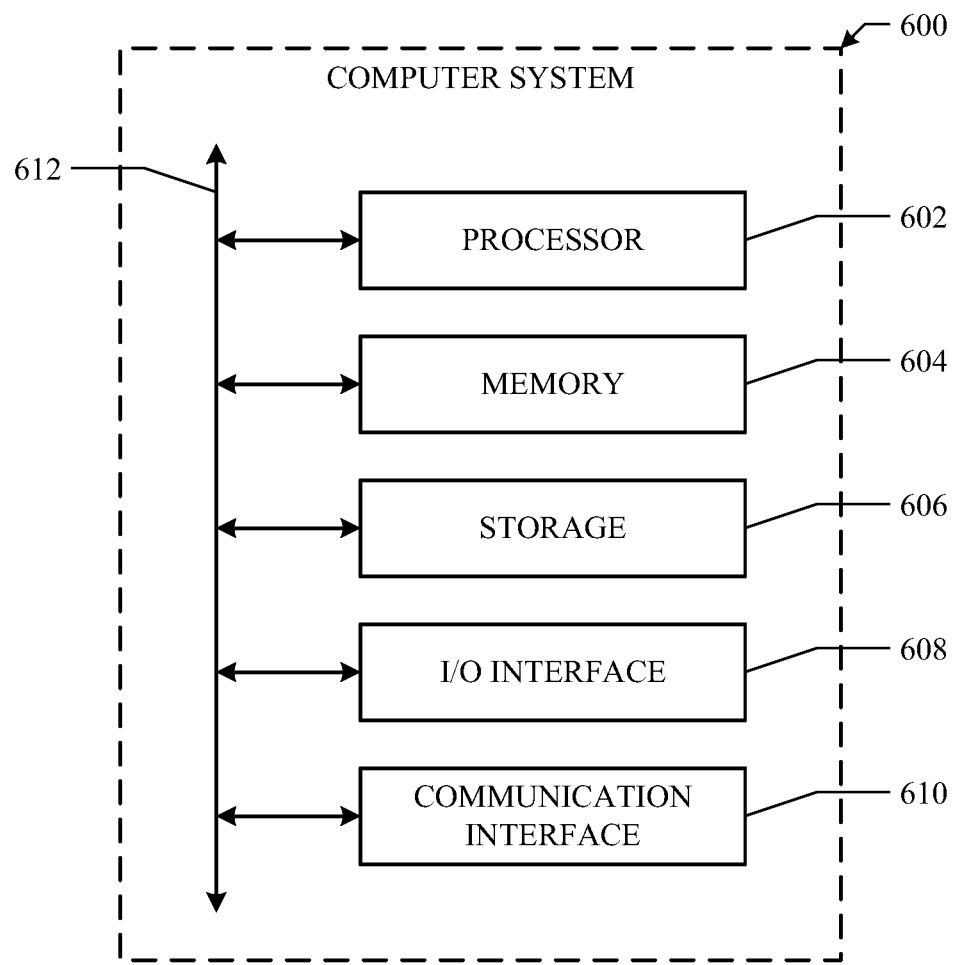
FIG. 6 illustrates an example computing system.

FIG. 6 illustrates an example computer system 600. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a remote server computer, which may include one or more remote server computing components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 that are to be operated on by computer instructions; the results of previous instructions executed by processor 602 that are accessible to subsequent instructions or for writing to memory 604 or storage 606; or any other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs), be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    receiving, in a vehicle from at least one sensor of the vehicle, (i) vehicle driving data associated with the vehicle driving in an environment, and (ii) detected environment data associated with the environment;
    generating a reference trajectory of the vehicle driving in the environment based on the vehicle driving data, wherein generating the reference trajectory includes deriving the reference trajectory from vehicle controls of an operator controlling the vehicle embodied in the vehicle driving data;
    generating, using a trajectory planner, a planned trajectory of the vehicle based on driving constraints of the environment from the environment data, wherein the planned trajectory is associated with cost functions having weight values of the trajectory planner;
    determining a difference in at least one parameter associated with the planned trajectory relative to the reference trajectory;
    adjusting one or more of the weight values associated with the cost functions based on the difference between the at least one parameter associated with the planned trajectory and the reference trajectory; and
    controlling the vehicle according to the trajectory planner that is based, at least in part, on the weight values that are adjusted.

2. The method of claim 1, wherein the driving constraints of the environment comprise at least one of observed driving constraints and predicted driving constraints, wherein the observed driving constraints correspond to actual states of the environment with respect to a reference time moment, and wherein the predicted driving constraints correspond to predicted states of the environment at future time moments with respect to the reference time moment.

3. The method of claim 2, wherein the planned trajectory is generated based on the driving constraints comprising the observed driving constraints corresponding to a first time before the reference time moment and the predicted driving constraints of the environment corresponding to a second time after the reference time moment.

4. The method of claim 3, wherein the predicted driving constraints comprise one or more of: a predicted trajectory of an agent in the environment, a predicted position of an agent in the environment, a predicted moving direction of an agent in the environment, a predicted velocity of an agent in the environment, a predicted trajectory of the vehicle in the environment, a predicted position of the vehicle in the environment, a predicted moving direction of the vehicle in the environment, or a predicted velocity of the vehicle in the environment.

5. The method of claim 3, wherein the observed driving constraints comprise first observed constraints corresponding to the first time before the reference time moment and second observed constraints corresponding to the second time after the reference time moment, and wherein the method further comprises:
    generating a new trajectory based on the first observed constraints corresponding to the first time before the reference time moment and the second observed constraints corresponding to the second time after the reference time moment;
    comparing the new trajectory to the trajectory of the vehicle; and
    adjusting one or more weight values of the weight values associated with the new trajectory based on a comparison between the trajectory and the new trajectory.

6. The method of claim 1, further comprising:
    generating a plurality of candidate trajectories based on the driving constraints of the environment, and wherein the planned trajectory is selected from one of the plurality of candidate trajectories based on an associated cost function.

7. The method of claim 6, wherein the associated cost function is associated with a plurality of cost terms, and wherein each cost term is associated with a weight indicating a relative importance level of that cost term.

8. The method of claim 7, wherein the plurality of cost terms of the cost function comprise one or more of: a distance to a closest obstacle, a distance to a lane boundary, a distance to a lead vehicle, a relative speed with respect to a lead vehicle, a difference between a trajectory speed and a speed limit, a maximum jerk, a maximum acceleration, a vehicle steering angle, a vehicle position, or a factor representing safety and comfort of a vehicle trajectory.

9. The method of claim 6, wherein the planned trajectory is selected from the plurality of candidate trajectories based on a trajectory-evaluation metric determined using the associated cost function based on a plurality of cost terms and respective weight values.

10. The method of claim 6, wherein the trajectory-evaluation metric is a sum of a plurality of cost terms as weighted by respective weight values, and wherein the associated cost function is a sum function.

11. The method of claim 6, wherein the associated cost function with adjusted one or more weights causes the reference trajectory to have a minimum trajectory-evaluation metric value.

12. The method of claim 6, wherein the associated cost function with adjusted one or more weights causes a candidate trajectory that is most similar to the reference trajectory to have a smallest trajectory-evaluation metric value among the plurality of candidate trajectories.

13. The method of claim 6, wherein the associated cost function with adjusted one or more weights causes a candidate trajectory having a feature vector that matches a distribution of a corresponding feature vector of the reference trajectory to have a smallest trajectory-evaluation metric value among the plurality of candidate trajectories.

14. The method of claim 6, wherein the associated cost function with adjusted one or more weights causes a candidate trajectory having a minimum feature-difference vector with respect to the reference trajectory to have a smallest trajectory-evaluation metric value among the plurality of candidate trajectories.

15. The method of claim 1, wherein one or more weights are adjusted using a gradient descent algorithm based on the vehicle driving data associated to a plurality of scenarios of the environment.

16. The method of claim 15, further comprising:
generating a plurality of new trajectories based on the vehicle driving data and the adjusted one or more weights;
evaluating vehicle performance based on the plurality of new trajectories using a simulation platform or a testing vehicle platform; and
identifying one or more first scenarios under which the vehicle performance fails to meet one or more predetermined criteria.

17. The method of claim 16, further comprising:
sending feedback information to a data collection module to collect new vehicle driving data associated with the one or more first scenarios; and
feeding the new vehicle driving data associated with the one or more first scenarios to an optimization pipeline to further adjust one or more weights of a plurality of weights of a trajectory generator.

18. The method of claim 1, further comprising:
generating a time-aggregated snapshot of the environment based on the environment data associated with the environment, wherein the trajectory of the vehicle is generated based on at least one the time-aggregated snapshot of the environment.

19. One or more non-transitory computer-readable storage media embodying software that is operable, when executed by one or more processors of a computing system, to:
receive, in a vehicle from at least one sensor of the vehicle, (i) vehicle driving data associated with the vehicle driving in an environment, and (ii) detected environment data associated with the environment;
generate a reference trajectory of the vehicle driving in the environment based on the vehicle driving data, wherein instructions to generate the reference trajectory include instructions to derive the reference trajectory from vehicle controls of an operator controlling the vehicle embodied in the vehicle driving data;
generate, using a trajectory planner, a planned trajectory of the vehicle based on driving constraints of the environment from the environment data, wherein the planned trajectory is associated with cost functions having weight values of the trajectory planner;
determine a difference in at least one parameter associated with the planned trajectory relative to the reference trajectory;
adjust one or more of the weight values associated with the cost functions based on the difference between the at least one parameter associated with the planned trajectory and the reference trajectory; and
controlling the vehicle according to a generated trajectory that is based, at least in part, on the weight values that are adjusted.

20. A system comprising:
one or more non-transitory computer-readable storage media embodying instructions; and
one or more processors coupled to the non-transitory computer-readable storage media and operable to execute the instructions to:
receive, in a vehicle from at least one sensor of the vehicle, (i) vehicle driving data associated with the vehicle driving in an environment, and (ii) detected environment data associated with the environment;
generate a reference trajectory of the vehicle driving in the environment based on the vehicle driving data, wherein the instructions to generate the reference trajectory include instructions to derive the reference trajectory from vehicle controls of an operator controlling the vehicle embodied in the vehicle driving data;
generate, using a trajectory planner, a planned trajectory of the vehicle based on driving constraints of the environment from the environment data, wherein the planned trajectory is associated with cost functions having weight values of the trajectory planner;
determine a difference in at least one parameter associated with the planned trajectory relative to the reference trajectory;
adjust one or more of the weight values associated with the cost functions based on the difference between the at least one parameter associated with the planned trajectory and the reference trajectory; and
controlling the vehicle according to the trajectory planner that is based, at least in part, on the weight values that are adjusted.

* * * * *